United States Patent
Mori et al.

(10) Patent No.: US 8,376,099 B2
(45) Date of Patent: Feb. 19, 2013

(54) VOLUME COMPENSATION ACCUMULATOR APPARATUS AND SUSPENSION SYSTEM USING THE SAME

(75) Inventors: Shunsuke Mori, Yokohama (JP); Takao Nakadate, Yamato (JP); Kenichi Nakamura, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 361 days.

(21) Appl. No.: 12/730,670

(22) Filed: Mar. 24, 2010

(65) Prior Publication Data

US 2010/0300821 A1    Dec. 2, 2010

(30) Foreign Application Priority Data

May 29, 2009    (JP) ................................. 2009-131066

(51) Int. Cl.
*F16F 9/46*    (2006.01)
(52) U.S. Cl. .................................................. 188/299.1
(58) Field of Classification Search ............... 188/266.5, 188/266.6, 299.1; 267/64.16–64.17; 280/5.503, 280/5.515
See application file for complete search history.

(56) References Cited

U.S. PATENT DOCUMENTS

| | | | | |
|---|---|---|---|---|
| 5,076,606 | A | * | 12/1991 | Takahashi .............. 280/124.161 |
| 5,222,759 | A | * | 6/1993 | Wanner et al. ............. 280/5.515 |
| 5,533,596 | A | * | 7/1996 | Patzenhauer et al. ...... 188/266.6 |
| 5,586,627 | A | * | 12/1996 | Nezu et al. ................. 188/266.6 |
| 5,725,239 | A | * | 3/1998 | de Molina .................. 280/5.503 |
| 5,924,528 | A | * | 7/1999 | Vermolen et al. .......... 188/266.1 |
| 7,562,750 | B2 | * | 7/2009 | Lemmens et al. ......... 188/266.1 |

FOREIGN PATENT DOCUMENTS

| | | |
|---|---|---|
| JP | 2006-519124 | 8/2006 |
| WO | 2004/076211 | 9/2004 |

* cited by examiner

*Primary Examiner* — Christopher Schwartz
(74) *Attorney, Agent, or Firm* — Wenderoth, Lind & Ponack, LLP

(57) ABSTRACT

A volume compensation accumulator apparatus connected to a conduit connecting hydraulic cylinders in a suspension system. The volume compensation accumulator apparatus includes an arrangement of the two orifice plates in series in a spaced-apart relation, which eliminates the necessity of reducing the diameters of the orifices while providing the same orifice characteristic as that of an orifice having a smaller diameter, thereby making the boring process of the orifice easy, and reducing clogging of the orifices with foreign objects.

6 Claims, 4 Drawing Sheets

VOLUME COMPENSATION ACCUMULATOR APPARATUS AND SUSPENSION SYSTEM USING THE SAME

BACKGROUND OF THE INVENTION

The present invention relates to a volume compensation accumulator apparatus for, in a suspension system connecting hydraulic cylinders each disposed between a wheel and a vehicle body through a conduit, compensating a volume of hydraulic fluid through a connection to the conduit of the suspension system, and the suspension system using the same.

There is known a suspension system controlling a vibration and a posture of a vehicle body by connecting the hydraulic cylinders mounted at the front right, front left, rear right and rear left wheels of the vehicle through a conduit, and controlling a flow of the hydraulic fluid between the hydraulic cylinders caused by, for example, a posture change of the vehicle body with use of an accumulator and a damping valve, as disclosed in, for example, Japanese Patent Application Domestic Announcement No. 2006-519124. This suspension system includes a volume compensation accumulator connected to the conduit via a volume compensation orifice having a sufficiently small flow passage area for compensating a change in the volume of the hydraulic fluid caused from, for example, the movable load of the vehicle and the temperature. According to this configuration, when a transient flow of the hydraulic fluid is generated by a posture change and a vibration of the vehicle body, the volume compensation orifice exerts a large resistance, thereby blocking a flow of the hydraulic fluid to the volume compensation accumulator. When a change in the volume of the hydraulic fluid in the conduit occurs on a regular basis based on, for example, the movable load of the vehicle and the temperature, the volume compensation orifice allows a flow of the hydraulic fluid to the volume compensation accumulator, thereby compensating the volume of the hydraulic fluid.

However, there is a problem regarding the volume compensation orifice; that is, it is difficult to achieve the required precision, since the volume compensation orifice should have an extremely small flow passage area.

SUMMARY OF THE INVENTION

An object of the present invention is to provide a volume compensation accumulator apparatus equipped with a volume compensation orifice capable of easily obtaining the required precision, and a suspension system using the same.

To achieve the foregoing object and other objects, the present invention provides a volume compensation accumulator apparatus for, in a suspension system connecting at least two hydraulic cylinders each disposed between a vehicle body and a wheel through a conduit, compensating a volume of hydraulic fluid through a connection to the conduit of the suspension system, the volume compensation accumulator apparatus comprising:

an accumulator;

a main body comprising a cylinder portion having one end side connected to the accumulator and the other end side connected to the conduit;

a first support member and a second support member fittedly fixed in the cylinder portion, the first and second support members each having an axially penetrating passage; and a plate-like orifice plate sandwiched between the first and second support members, the orifice plate having an orifice in communication with the passages of the first and second support members.

DETAILED DESCRIPTION OF THE INVENTION

Figure 2:
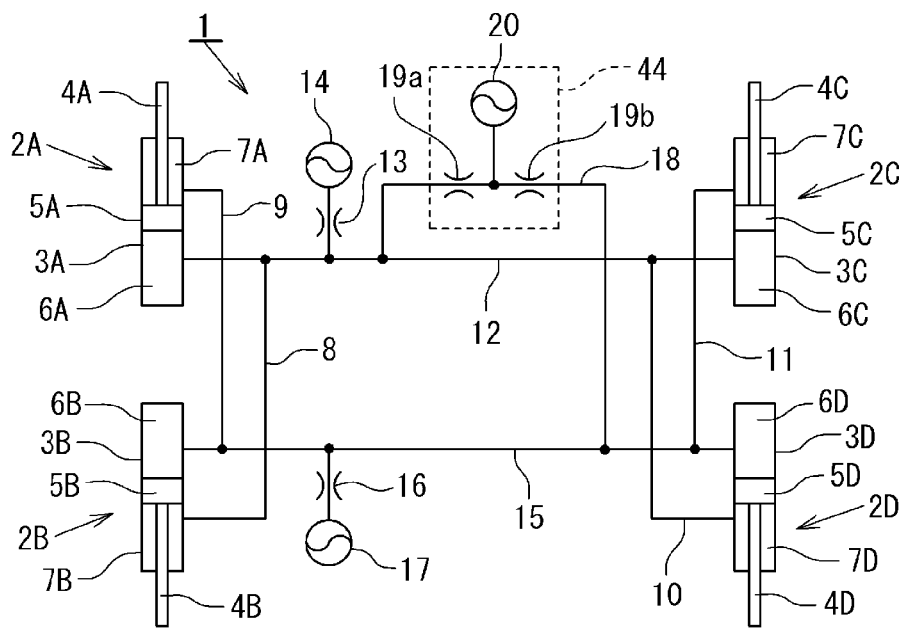
FIG. 2 is a circuit diagram schematically illustrating a configuration of a suspension system of a vehicle to which the volume compensation accumulator according to the present invention can be employed.

Hereinafter, an embodiment of the present invention will be described in detail with reference to the accompanying drawings. FIG. 2 is a circuit diagram of a suspension system of a vehicle with regard to the present invention. As shown in FIG. 2, a suspension system 1 comprises hydraulic cylinder apparatuses 2A, 2B, 2C and 2D, each of which is disposed between the sprung side (vehicle body side) and the unsprung side (wheel side) of a suspension mechanism supporting each of front right, front left, rear right and rear left wheels via a suspension spring. (Alphabets A, B, C, D respectively represent the front right wheel, front left wheel, rear right wheel and rear left wheel which are positions where the hydraulic cylinder apparatuses 2 are disposed.) The hydraulic cylinder apparatus 2 comprises a cylinder 3 sealingly containing hydraulic fluid, a piston 5 slidably inserted in the cylinder 3, and a piston rod 4 coupled with the piston 5 and extending to the outside of the cylinder 3. The piston 5 divides the interior of the cylinder 3 into a cylinder lower chamber 6 positioned at the bottom side of the cylinder 3, and a cylinder upper chamber 7 positioned at the piston rod 4 side of the cylinder 3. The hydraulic cylinder apparatus 2 is connected at the cylinder 3 side thereof to the unsprung side, and is connected at the piston rod 4 thereof to the sprung side.

Between the hydraulic cylinder apparatus 2A at the front right wheel and the hydraulic cylinder apparatus 2B at the front left wheel, the cylinder lower chamber 6A and the cylinder upper chamber 7B are connected to each other through a conduit 8, and the cylinder upper chamber 7A and the cylinder lower chamber 6B are connected to each other through a conduit 9. Between the hydraulic cylinder apparatus 2C at the rear right wheel and the hydraulic cylinder apparatus 2D at the rear left wheel, the cylinder lower chamber 6C and the cylinder upper chamber 7D are connected to each other through a conduit 10, and the cylinder upper chamber 7C and the cylinder lower chamber 6D are connected to each other through a conduit 11. The conduit 8 and the conduit 10 are connected to each other through a conduit 12, to which an accumulator 14 is connected through a damping valve 13. The conduit 9 and the conduit 11 are connected to each other through a conduit 15, to which an accumulator 17 is connected through a damping valve 16. The damping valves 13 and 16 respectively generate damping forces by controlling flows of the hydraulic fluid between the conduit 12 and the accumulator 14, and the conduit 15 and the accumulator 17.

Further, the conduit 12 and the conduit 15 are connected to each other through a conduit 18, to which a volume compensation accumulator apparatus 44 is connected. The volume compensation accumulator apparatus 44 comprises two volume compensation orifice apparatuses 19a and 19b arranged in series in the conduit 18, and a volume compensation accumulator 20 connected between the volume compensation orifice apparatuses 19a and 19b in the conduit 18. The flow passage areas of the volume compensation orifice apparatuses 19a and 19b are extremely small, compared to those of the damping valves 13 and 16, so that a sufficiently strong flow resistance can be provided.

Next, the details of the structures of the volume compensation orifice apparatuses 19a and 19b, which are main components of the present invention, will be described with reference to FIGS. 1 and 3. The volume compensation orifice apparatuses 19a and 19b have an identical structure, and therefore will be described collectively as the volume compensation orifice apparatus 19.

Figure 1:
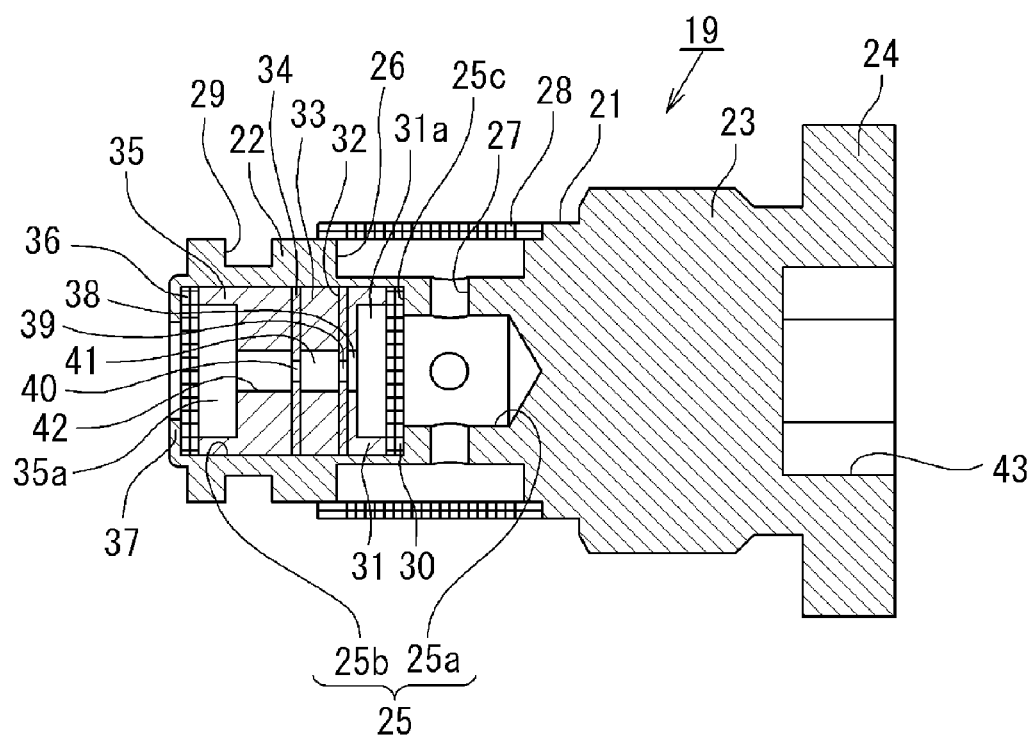
FIG. 1 is a vertical cross-sectional view illustrating a volume compensation orifice used in a volume compensation accumulator with regard to a first embodiment of the present invention.
Figure 3:
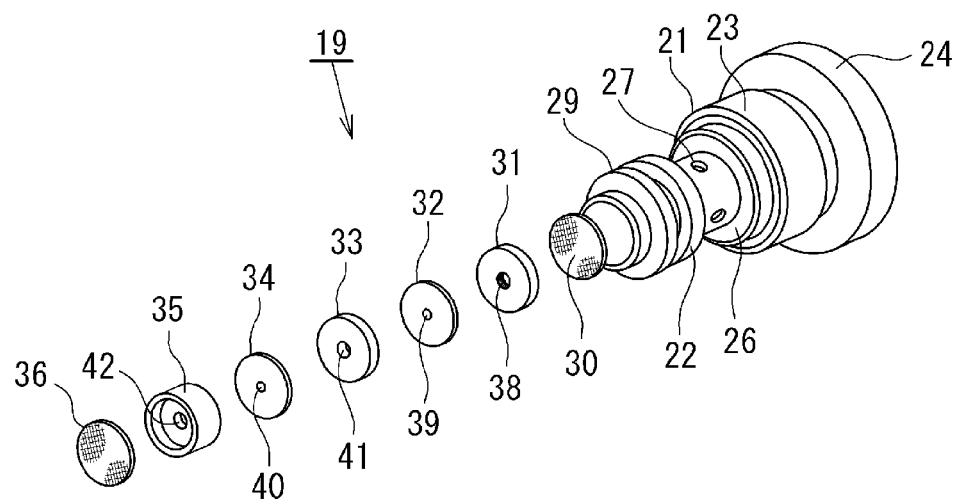
FIG. 3 is an exploded perspective view of the volume compensation orifice shown in FIG. 1.

As shown in FIGS. 1 and 3, the volume compensation orifice apparatus 19 comprises a main body 21. The main body 21 includes a bottomed cylindrical cylinder portion 22 at one end side thereof, and a screw portion 23 at the other end side thereof. The screw portion 23 is formed coaxially with the cylinder portion 22 which corresponds to a cylinder portion of the present invention, and has a slightly larger diameter than that of the cylinder portion 22. Further, a flange-like head portion 24 having an enlarged diameter is formed at the end of the screw 23.

The cylinder portion 22 has a stepped bore 25 therein, which is constituted by a small-diameter portion 25a positioned at the bottom side, and a large-diameter bore 25b positioned at the opening side. An annular groove 26 is formed at the outer circumferential portion of the proximal side of the cylinder portion 22. A plurality of radially extending passages 27 is formed through the side wall of the small-diameter bore 25a for allowing communication between the small-diameter bore 25a and the annular groove 26. A cylindrical filter 28 is fittedly attached around the outer circumferential portion of the proximal side of the cylinder portion 22 so as to cover the annular groove 26. A seal groove 29 as an annular groove is formed at the outer circumferential portion of the distal side of the cylinder portion 22. Although it is preferable that the inner circumferential portion of the cylinder portion 22 has a circular shape in consideration of manufacturing of the components contained therein, the shape of the outer circumferential portion of the cylinder portion 22 is not limited to a circular shape, and may be polygonal according to requirements and circumstances.

The large-diameter portion 25b of the stepped bore 25 fittedly contains a disk-shaped filter 30, a support member 31 which is a first support member, an orifice plate 32, a spacer 33, an orifice plate 34, a support member 35 which is a second support member, and a filter 36, in this order from the small-diameter portion 25a side to the opening side. They are fixed by inwardly swaging a thin tip 37 of the cylinder portion 22.

The filter 30 is positionally fixed by the abutment of one end thereof against a stepped portion 25c of the stepped bore 25. The support member 31 is a bottomed cylindrical member, and is disposed so that the end of the opening side thereof abuts against the filter 30 to define a chamber 31a inside the support member 31, whereby the filter 30 can have an increased effective area. A passage 38 penetrates through the center of the bottom of the support member 31.

Figure 6:
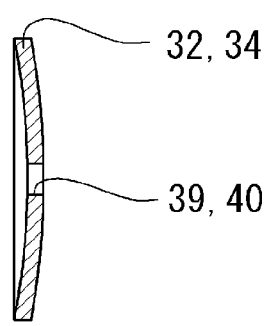
FIG. 6 is an enlarged vertical cross-sectional view illustrating an orifice plate of the volume compensation orifice shown in FIG. 5.

The orifice plates 32 and 34 are respectively prepared by forming orifices 39 and 40 each having an extremely small diameter such as approximately 0.1 mm through the centers of disk-shaped members. The orifices 39 and 40 can be formed by known machining such as a punching process or a boring process. It should be noted that the thicknesses of the orifice plates 32 and 34 are limited for ensuring sufficient precision, since the diameters of the orifices are extremely small. In addition, reducing the thicknesses of the plates (employing thin plates) can make the processing easy. For example, if the diameters of the orifices 39 and 40 are approximately 0.1 mm, the orifice plates 32 and 34 made of stainless steel can each have a thickness of approximately 0.1 mm. Further, as shown in FIG. 6, the orifice plates 32 and 34 are slightly curved and spherically formed, and become flat by being pressed against the support member 31, the spacer 33 and the support member 35 when the tip 37 of the cylinder portion 22 is swaged, whereby close contacts are established between the orifice plates 32 and 34 and their adjacent components.

The spacer 33 is a disk-shaped member thicker than the orifice plates 32 and 34, and a passage 41 having a diameter of approximately 2 mm is formed through the center of the spacer 33. The support member 35 is a bottomed cylindrical member, and is disposed so that the end of the opening side thereof abuts against the filter 36 to define a chamber 35a inside the support member 35, whereby the filter 36 can have an increased effective area. A passage 42, which has a diameter of approximately 2 mm similar to the passage 41, penetrates through the center of the bottom of the support member 35. Referring to the head portion 24 of the main body 21, a tool hole 43 is formed at the center of the head portion 24. The tool hole 43 has a shape conforming with the shape of the tip of a fastening tool having a non-circular shape such as a hexagonal shape or a star shape. The tool hole 43 may be omitted, and instead, the head portion 24 may have an outer shape conforming with the shape of the tip of a fastening tool.

The volume compensation orifice apparatus 19 is attached to the volume compensation accumulator 20 by attaching an O-ring in the seal groove 29 of the cylinder portion 22, inserting the volume compensation orifice apparatus 19 into an attachment hole of the case of the volume compensation accumulator 20, inserting a fastening tool into the tool hole 43 of the head portion 24, and then screwing the screw portion 23 into the threaded portion of the attachment hole of the volume compensation accumulator 20. The volume compensation accumulator apparatus 44 (refer to FIG. 2) is constructed by attaching the two volume compensation orifice apparatuses 19a and 19b to the volume compensation accumulator 20 so as to integrally assemble them. In this state, the orifices 39 and 40 of the orifice plates 32 and 34 are connected to the volume compensation accumulator 20 through the filter 36, and are also connected to the conduit 18 through the two filters 28 and 30.

The first embodiment configured as mentioned above functions as follows. The suspension system 1 generates a damping force by controlling, with use of the damping valves 13 and 16, flows of the hydraulic fluid sent from/to the accumulators 14 and 17 through the damping valves 13 and 16, when the piston rods 4A, 4B, 4C and 4D of the hydraulic cylinder apparatuses 2A, 2B, 2C and 2D each perform a stroke in response to a vibration of the sprung side and unsprung side at the wheel.

For example, when the piston rods 4A and 4B of the hydraulic cylinder apparatuses 2A and 2B at the front right and front left wheels simultaneously perform strokes in the compression direction (same phase), in the hydraulic cylinder apparatuses 2A and 2B, the hydraulic fluid in the cylinder lower chambers 6A and 6B is pressurized and the hydraulic fluid in the cylinder upper chambers 7A and 7B is depressurized. At this time, since the hydraulic fluid is sent from the pressurized cylinder lower chambers 6A and 6B to the depressurized cylinder upper chambers 7B and 7A through the conduits 8 and 9, the hydraulic fluid flows through the conduits 12 and 15 and is sent to the accumulators 14 and 17 via the damping valves 13 and 16 by a small amount corresponding to the entries of the piston rods 4A and 4B into the cylinder upper chambers 7A and 7B, whereby a small damping force is generated.

Similarly, when the piston rods 4A and 4B of the hydraulic cylinder apparatuses 2A and 2B at the front right and front left wheels simultaneously perform strokes in the extension direction (same phase), in the hydraulic cylinder apparatuses 2A and 2B, the hydraulic fluid in the cylinder upper chambers 7A and 7B is pressurized and the hydraulic fluid in the cylinder lower chambers 6A and 6B is depressurized. At this time, since the hydraulic fluid is sent from the pressurized cylinder upper chambers 7A and 7B to the depressurized cylinder lower chambers 6B and 6A through the conduits 9 and 8, the hydraulic fluid is sent from the accumulators 14 and 17 to the conduits 12 and 15 via the damping valves 13 and 16 by a small amount corresponding to the exits of the piston rods 4A and 4B from the cylinder upper chambers 7A and 7B, whereby a small damping force is generated.

On the other hand, when the piston rod 4A, which is one of the piston rods of the hydraulic cylinder apparatuses 2A and 2B at the front right and front left wheels, performs a stroke in the compression direction while the piston rod 4B, which is the other rod, performs a stroke in the extension direction (reversed phase), a large amount of hydraulic fluid is sent from the conduit 12 to the accumulator 14 via the damping valve 13 since the pressurized cylinder lower chamber 6A and cylinder upper chamber 7B are connected through the conduit 8. At the same time, a large amount of hydraulic fluid is sent from the accumulator 17 to the conduit 9 via the damping valve 16 since the depressurized cylinder upper chamber 7A and the cylinder lower chamber 6B are connected through the conduit 9. Therefore, a larger damping force is generated compared to a damping force under the above-mentioned same phase situation. Similarly, when the piston rod 4A performs a stroke in the extension direction and the piston rod 4B performs a stroke in the compression direction, a large amount of hydraulic fluid is also sent from and to the accumulators 14 and 17 via the damping valves 13 and 16, whereby a large damping force is generated.

It should be noted that flows of the hydraulic fluid generated by strokes of the hydraulic cylinder apparatuses 2A, 2B, 2C and 2D hardly cause a flow of the hydraulic fluid through the conduit 18 connecting the conduits 12 and 15, due to substantial blocking by a flow resistance generated by the volume compensation orifice apparatuses 19a and 19b each having an extremely small flow passage area.

Therefore, when the hydraulic cylinder apparatuses 2A and 2B at the front right and front left wheels perform strokes in the same direction (same phase), a small damping force is generated, whereby a vibration of the unsprung side can be sufficiently absorbed. When the hydraulic cylinder apparatuses 2A and 2B perform strokes in different directions (reversed phase), a large damping force is generated, whereby rolling of the vehicle body can be stabilized. Similarly, when the hydraulic shock absorbers 2C and 2D at the rear right and rear left wheels perform strokes in the same direction (same phase), a small damping force is generated, whereby a vibration of the unsprung side can be sufficiently absorbed. When the hydraulic shock absorbers 2C and 2D perform strokes in different directions (reversed phase), a large damping force is generated, whereby rolling of the vehicle body can be stabilized when the vehicle turns or corners.

On the other hand, the volume of the hydraulic fluid is changed on a regular basis due to a temperature change, and when the extension/compression positions of the piston rods 4A, 4B, 4C and 4D of the hydraulic cylinder apparatuses 2A, 2B, 2C and 2D are changed, which regularly occurs due to a change in the movable load caused by, for example, passengers' boarding on and leaving from the vehicle, loading and unloading of cargoes, and an increase and a decrease in fuel. At this time, the pressure change is absorbed by supplying and returning the hydraulic fluid from and to the volume compensation accumulator 20 via the volume compensation orifice apparatuses 19a and 19b.

The volume compensation orifice apparatus 19 connect the passage 18 and the volume compensation accumulator 20 through the two orifices 39 and 40 arranged in series and the three filters 28, 30 and 36. Due to the arrangement of the orifices 39 and 40 in series, the flow resistance relative to the flow passage area can be increased, compared to a structure using only a single orifice. Therefore, the diameters of the orifices can be increased, thereby reducing clogging of the orifices with foreign objects and making the boring process easy. As a result, the orifice plates 32 and 34 having the orifices 39 and 40 can be easily manufactured by press working. Since the two filters 28 and 30 are disposed at the hydraulic cylinder apparatuses 2A, 2B, 2C and 2D side where foreign objects such as contamination are more likely to enter, it is possible to reduce clogging of the extremely small orifices 39 and 40 with foreign objects, and reduce entries of foreign objects into the volume compensation accumulator 20. Since the orifice plates 32 and 34 are formed into a slightly curved and substantially spherical shape as shown in FIG. 6, and therefore an axial force is generated due to the elasticity in an assembled state, it is possible to enhance the closeness of the contacts among the filter 30, the support member 31, the orifice plate 32, the spacer 33, the orifice plate 34, the support member 35 and the filter 36, whereby a leak occurrence can be prevented.

In the above-discussed embodiment, the orifice characteristic (flow resistance) can be adjusted by increasing or decreasing the numbers of the orifice plates 32 and 34 and the spacer 33. Increasing the numbers of them reduces the necessity of decreasing the diameters of the orifices, and thereby the possibility of clogging of the orifices with foreign objects, while providing the same characteristic as that of an orifice having a smaller diameter.

Figure 4:
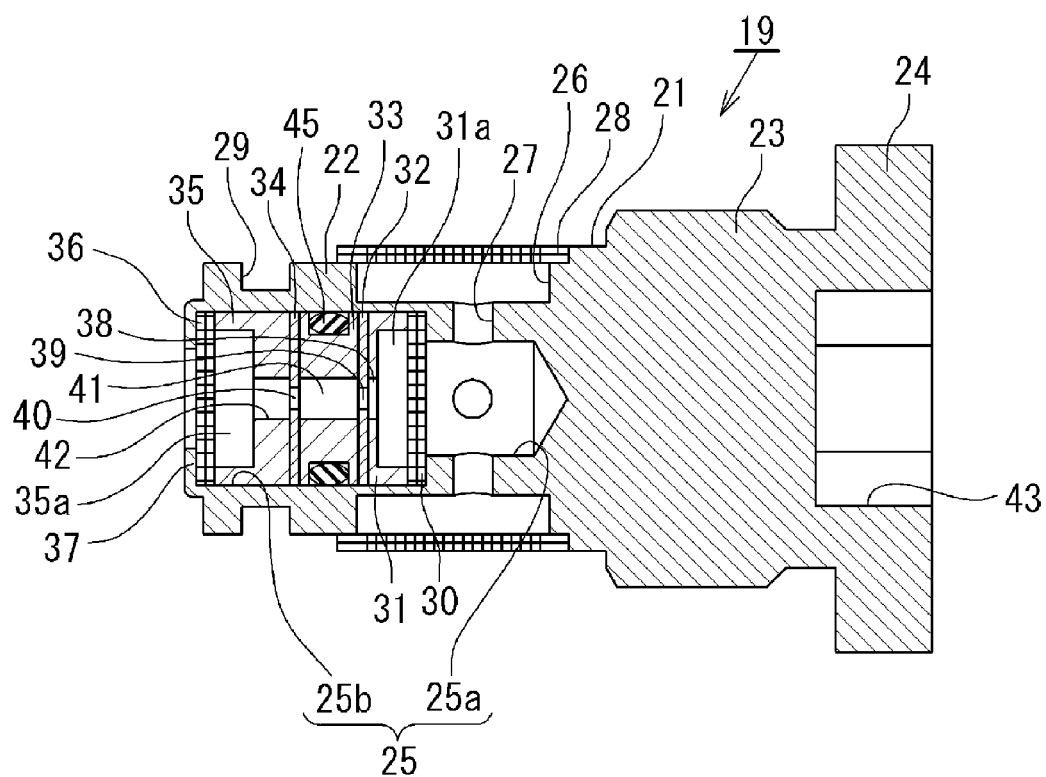
FIG. 4 is a vertical cross-sectional view of a first variant of the volume compensation orifice shown in FIG. 1.

Further, in the above-discussed embodiment, the spacer 33 between the orifice plates 32 and 34 is press-fitted in the large-diameter portion 25b of the stepped bore 25 to create an interference fit so that a leak between the orifice plates 32 and 34 can be prevented, thereby stabilizing the orifice characteristic. Instead of employing this measure, the same effect can be obtained by disposing an O-ring 45 between the spacer 33 and the large-diameter portion 25b to provide a seal therebetween as shown in FIG. 4. In FIG. 4, like components are denoted by the same reference numerals as those shown in FIG. 1.

Next, a variant of the volume compensation orifice apparatus 19 will be described with reference to FIG. 5. In the following description, like components will be denoted by the same reference numerals as those shown in FIG. 1, and only different features will be described in detail.

Figure 5:
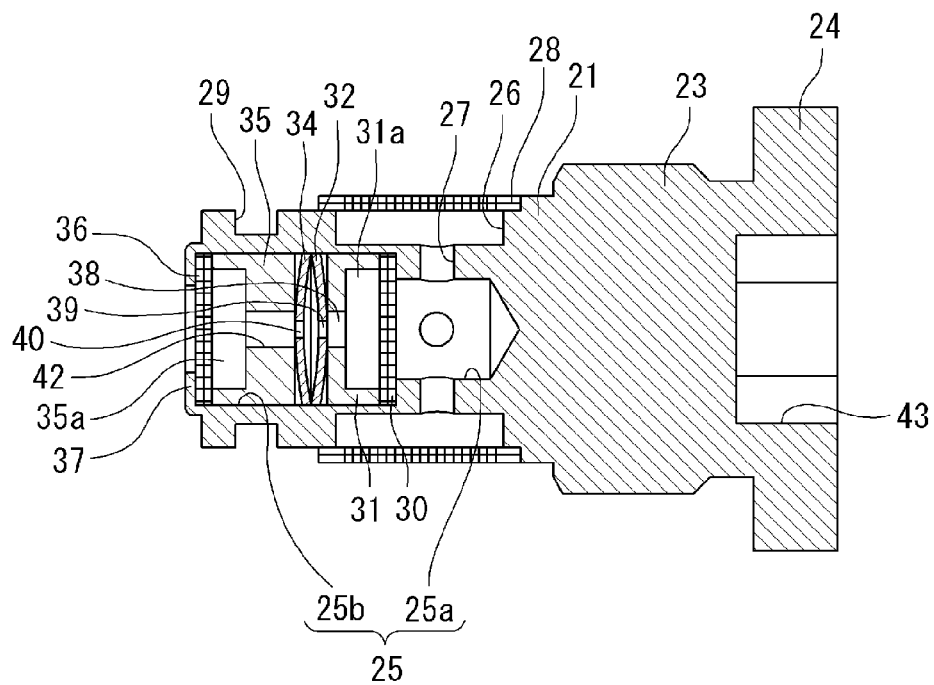
FIG. 5 is a vertical cross-sectional view of a second variant of the volume compensation orifice shown in FIG. 1.

The variant shown in FIG. 5 does not have the spacer 33, and instead, a space is generated between the orifices 39 and 40 by disposing the orifice plates 32 and 34 in such a manner that the concave surfaces of the orifice plates 32 and 34 face each other. Due to this arrangement, the spacer 33 can be omitted, and the required precision of the center positions of the orifices 39 and 40 can be eased, while the same effect as that of the above-discussed embodiment can be obtained.

The volume compensation accumulator apparatus 44 can be used for volume compensation of hydraulic fluid in not only the suspension system 1 in the above-discussed embodiment, but also in another suspension system having a different circuit configuration by being connected to a conduit thereof, as long as, in the another suspension system, at least two hydraulic cylinder apparatus disposed between a vehicle body and wheels are connected to each other through the conduit.

According to the above-discussed embodiment of the present invention, it is possible to provide a volume compensation accumulator equipped with a volume compensation orifice capable of easily obtaining the required precision, and a suspension system using the same.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2009-131066 filed on May 29, 2009 including specification, claims, drawings and summary is incorporated herein by reference in its entirety.

What is claimed is:

1. A volume compensation accumulator apparatus for, in a suspension system connecting at least two hydraulic cylinders each disposed between a vehicle body and a wheel through a conduit, compensating a volume of hydraulic fluid through a connection to the conduit of the suspension system, the volume compensation accumulator apparatus comprising:
   an accumulator;
   a main body comprising a cylinder portion having one end side connected to the accumulator and the other end side connected to the conduit;
   a first support member and a second support member fittedly fixed in the cylinder portion, the first and second support members each having an axially penetrating passage;
   a plurality of plate-like orifice plates sandwiched between the first and second support members, each of the orifice plates having an orifice in communication with the passages of the first and second support members; and
   a spacer disposed between the orifice plates and having a passage in communication with the orifices of the orifice plates.

2. The volume compensation accumulator apparatus according to claim 1, wherein the orifice of each orifice plate has a sufficiently small flow passage area for blocking a flow of the hydraulic fluid in the conduit which is generated by a stroke of the hydraulic cylinder.

3. The volume compensation accumulator apparatus according to claim 1, wherein the plurality of orifice plates comprise two orifice plates, and
   the two orifice plates are substantially spherically curved and disposed so that the concave surfaces thereof face each other between the first support member and the second support member.

4. A suspension system comprising:
   at least two hydraulic cylinders each disposed between a vehicle body and a wheel;
   a conduit connecting the hydraulic cylinders; and
   a volume compensation accumulator apparatus connected to the conduit for compensating a volume of hydraulic fluid, the volume compensation accumulator apparatus comprising:
   an accumulator;
   a main body comprising a cylinder portion having one end side connected to the accumulator and the other end side connected to the conduit;
   a first support member and a second support member fittedly fixed in the cylinder portion, the first and second support members each having an axially penetrating passage;
   a plurality of plate-like orifice plates sandwiched between the first and second support members, each of the orifice plates having an orifice in communication with the passages of the first and second support members; and
   a spacer disposed between the orifice plates and having a passage in communication with the orifices of the orifice plates.

5. The suspension system according to claim 4, wherein the orifice of each of the orifice plates has a sufficiently small flow passage area for blocking a flow of the hydraulic fluid in the conduit which is generated by a stroke of the hydraulic cylinder.

6. The suspension system according to claim 4, wherein the plurality of orifice plates comprises two orifice plates, and
   the two orifice plates are substantially spherically curved and disposed so that the concave surfaces thereof face each other between the first support member and the second support member.

* * * * *